(12) United States Patent
Shekhar et al.

(10) Patent No.: US 9,870,347 B1
(45) Date of Patent: Jan. 16, 2018

(54) NETWORK SITE CONVERSION WITH RESPECT TO A DEVELOPMENT TOOLKIT

(71) Applicant: Amazon Technologies, Inc., Reno, NV (US)

(72) Inventors: Shashank Shekhar, Seattle, WA (US);
Jay Austin Crosley, Redmond, WA (US); Oleg Oleg Pistolet, Seattle, WA (US); Satish Kumar Eerpini, Sunnyvale, CA (US); Gurinder Raju, Seattle, WA (US); Cameron Dailey Austgen, Seattle, WA (US); Seth Bradon Kinast, Seattle, WA (US); Teresa Shuk Kwan Lau, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 896 days.

(21) Appl. No.: 14/106,445

(22) Filed: Dec. 13, 2013

(51) Int. Cl.
*G06F 17/00* (2006.01)
*G06F 17/30* (2006.01)
*G06F 17/22* (2006.01)

(52) U.S. Cl.
CPC .... *G06F 17/2247* (2013.01); *G06F 17/30569* (2013.01)

(58) Field of Classification Search
CPC ............. G06F 17/227; G06F 17/30076; G06F 17/3089; G06F 17/30569; G06F 17/27
See application file for complete search history.

(56) References Cited

U.S. PATENT DOCUMENTS

| 2008/0082987 | A1* | 4/2008 | Mao | H04L 67/02 719/313 |
| 2009/0055749 | A1* | 2/2009 | Chatterjee | G06F 3/04817 715/738 |
| 2014/0047413 | A1* | 2/2014 | Sheive | H04L 65/403 715/753 |
| 2014/0280482 | A1* | 9/2014 | Crosley | G06F 17/3089 709/203 |
| 2014/0282371 | A1* | 9/2014 | Hirsch | G06F 8/36 717/106 |

* cited by examiner

*Primary Examiner* — Ariel Mercado Vargas
(74) *Attorney, Agent, or Firm* — Kilpatrick Townsend & Stockton LLP

(57) ABSTRACT

Conversion of a network site from a particular network site development platform to a different network site development platform may be facilitated by a network site conversion service. The merchant may provide the network site conversion service with a uniform resource locator that references a home document of the network site. The network site conversion service may traverse the source network site to determine the source network site's internal structure. The collected data may be analyzed. For example, aspects of the source network site may be mapped to components of the destination network site development platform. A converted network site may be generated based on the analysis. For example, the aspects of the source network site having mappings to the components of the destination network site development platform may be implemented with those components in the converted network site. The converted network site may then be published.

23 Claims, 10 Drawing Sheets

NETWORK SITE CONVERSION WITH RESPECT TO A DEVELOPMENT TOOLKIT

BACKGROUND

It has become common for merchants to operate electronic marketplaces for their goods and services (collectively, "items") as well as, or even in place of, conventional brick-and-mortar marketplaces. Such electronic marketplaces may include one or more network sites (e.g., "web" sites operating in accordance with a hypertext transfer protocol) providing graphical user interfaces (e.g., with network documents such as "web pages" specified with a hypertext markup language) that enable consumers to purchase the merchant's items. As consumers have gained experience with electronic marketplaces, they have developed certain expectations from electronic marketplaces in general including expectations with respect to electronic marketplace infrastructure services such as item discovery including search, item purchase including payment, item fulfillment including shipping, and account maintenance including security. As consumer expectations rise, costs associated with meeting those expectations can become significant.

To control costs, merchants may seek out specialist providers of electronic marketplace infrastructure services. Some merchants may wish to make use of such providers, while at the same time maintaining an appearance of a stand-alone electronic marketplace, for example, to avoid brand dilution by comingling with other brands in the larger electronic marketplaces. Often, merchants have invested significant resources in a custom stand-alone electronic marketplace, and desire to see the investment preserved as much as possible. Such custom stand-alone electronic marketplaces may be associated with a first network site development "platform" (e.g., a computer systems architecture that facilitates the development and maintenance of network sites), while a given infrastructure services provide may be associated with a second such platform. The cost (e.g., in time and/or resources) required to convert a network site from one development platform to another can be significant. Conventional approaches to facilitating such conversions are inefficient and/or ineffective.

BRIEF DESCRIPTION OF THE DRAWINGS

Various embodiments in accordance with the present disclosure will be described with reference to the drawings, in which.

DETAILED DESCRIPTION

Figure 1:
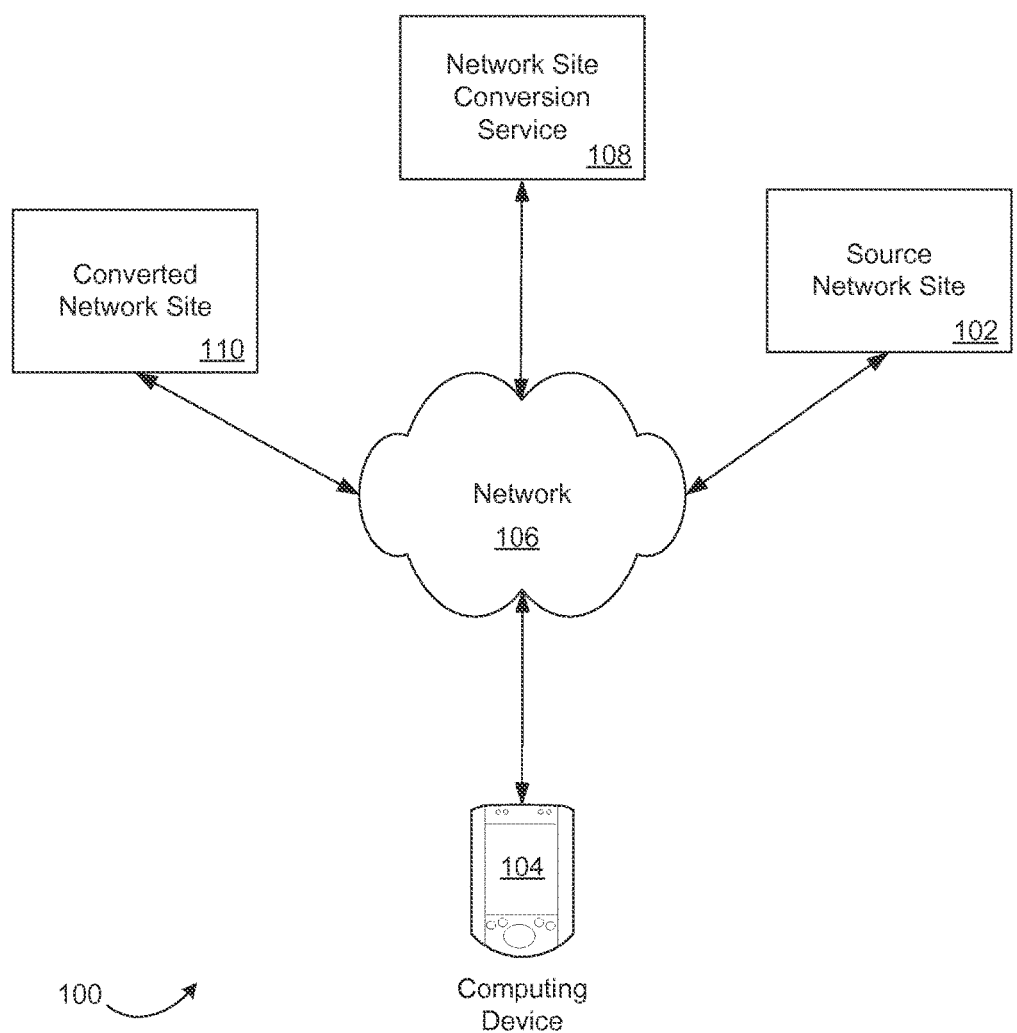
FIG. 1 is a schematic diagram depicting aspects of an example system architecture in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

In accordance with at least one embodiment, conversion of a network site from a particular network site development platform (e.g., a web site development platform, sometimes called a "web development toolkit") to a different network site development platform may be facilitated by a network site conversion service. For example, the network site may be a graphical user interface to an electronic marketplace operated by a merchant and developed with respect to a first network site development platform. The merchant may wish to take advantage of one or more electronic marketplace infrastructure services provided by a second network site development platform and, accordingly, may use the network site conversion service to convert the network site to the second network site development platform.

To do so, in accordance with at least one embodiment, the merchant may provide the network site conversion service with a uniform resource locator (e.g., a URL) that references a home document of the network site. The network site conversion service may traverse the network site (the "source network site") to determine the source network site's internal structure. The collected data may be analyzed. For example, aspects of the source network site may be mapped to components of the destination network site development platform. A converted network site may be generated based on the analysis. For example, the aspects of the source network site having mappings to the components of the destination network site development platform may be implemented with those components in the converted network site. The converted network site may then be published. For example, the converted network site may be hosted by the infrastructure services provider.

To give a particular example, suppose merchant "Acme Brand Clothing, Inc." operates network site "acme-clothing.com" which offers a wide variety of clothing for sale. Acme invests a significant amount of time and money in establishing the network site. In particular, Acme invests in a brand-specific "look and feel" that proves popular. After several years of rising sales, Acme determines that the initial infrastructure services of the network site (e.g., search, payment, shipping and security) are at their limit and threaten to undermine performance. Estimates for custom infrastructure upgrades are astonishingly expensive, but Acme identifies an electronic marketplace infrastructure services provider (Universal Systems, Inc.) that meets its requirements at a reasonable cost. However, the network site acmeclothing.com was developed with the "My First Storefront" network site development platform, while Universal Systems requests that network sites use its "Universal Infrastructure" network site development platform to access the infrastructure services that Universal Systems provides. A network site conversion is requested. A manual re-coding of the network site would be expensive in terms of time and resources, but Acme would like to preserve the popular "look and feel" of the existing site. In accordance with at least one embodiment, Universal Systems (or another service provider) provides a conversion service that enables Acme to convert acmeclothing.com to the new Universal Infrastructure network site development platform. After conversion, acmeclothing.com uses the same URL, but is hosted on Universal Systems servers and has access to the improved infrastructure services.

In accordance with at least one embodiment, target web development toolkits may include multiple components corresponding to sets of electronic marketplace functionality that are common across a variety of electronic marketplace network sites. For example, particular components may be configured to implement category navigation, keyword search, search refinement, dynamic network site navigation, customer account functions, virtual shopping cart functions, a related items feature, and the like. Network sites may be implemented with one or more network documents including static network documents and dynamically generated network documents. Such network documents may collectively specify one or more graphical user interfaces of a network site and, as used herein, the term "network document" may refer to the data object itself including specification language statements (e.g., hypertext markup language) and/or to a corresponding graphical user interface or component thereof (e.g., an interactive page of hypertext rendered in a hypertext browser such as a "web" browser). Source network sites may be analyzed to identify "framework" regions, that is, regions (e.g., areas, rectangles, contiguous polygons) of network documents of a source network site that are semantically stable, for example, that are semantically static across multiple network documents of a same type. In contrast, non-framework or "instance" regions may be semantically dynamic. For example, framework regions of an item detail document may correspond to common graphic user interface elements across multiple item detail documents, whereas non-framework regions may correspond to the dynamically changing item details presented in a framework defined by the framework regions. Regions need not be graphically static in order to be semantically stable. For example, a region including a "drop down" menu may dynamically change appearance in response to user interaction while having a clear and unchanging status as a menu. As another example, a region with consistent functionality (e.g., responsive to user interaction) may be graphically dynamic and semantically stable. The framework regions may be mapped to sets of electronic marketplace functionality and/or to components of the target web development toolkit.

FIG. 1 depicts aspects of an example system architecture 100 in accordance with at least one embodiment. The architecture 100 includes a source network site 102 communicatively coupled with a computing device 104 through a network 106. For example, the source network site 102 may be a web-based graphical user interface of an electronic marketplace, and a consumer may utilize the computing device 104 to purchase items with the source network site 102. The network 106 may include any suitable elements of a communications network including elements related to analog and digital signals. For example, the network 106 may include one or more data networks including one or more packet switched networks and/or may support an internetworking protocol such as TCP/IP.

A network site conversion service 108 may access the source network site 102 to obtain data to generate a converted network site 110. The converted network site 110 may be a web-based graphical user interface of an electronic marketplace, and the consumer may utilize the computing device 104 to purchase the items with the converted network site 110. In accordance with at least one embodiment, the converted network site 110 may be implemented at least in part with a different web development toolkit than the source network site 102. Accordingly, the converted network site 110 may be associated with a different electronic marketplace than the source network site 102.

Figure 2:
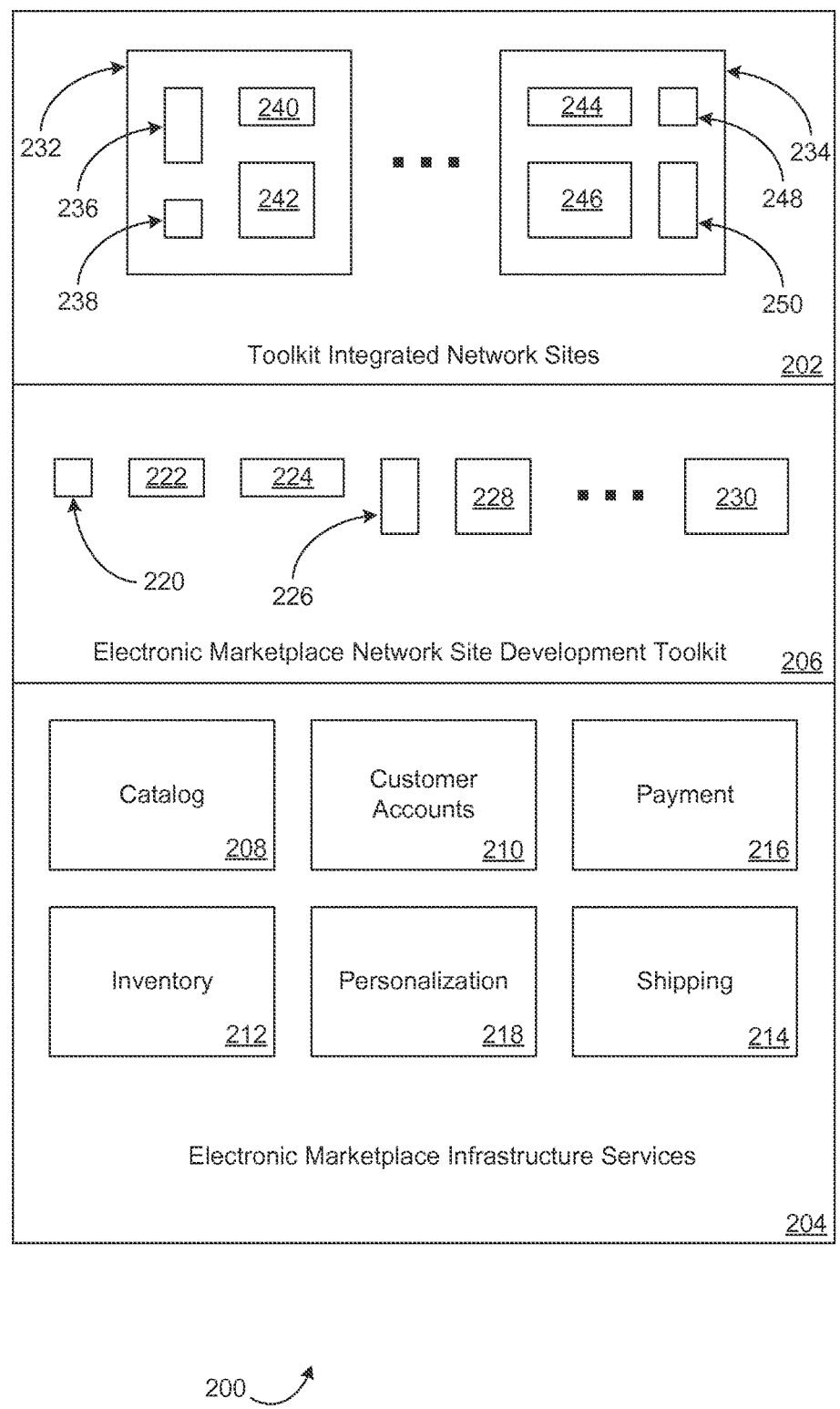
FIG. 2 is a schematic diagram depicting aspects of an example electronic marketplace in accordance with at least one embodiment.

FIG. 2 depicts aspects of an example electronic marketplace 200 in accordance with at least one embodiment. The electronic marketplace 200 may include multiple network sites 202 that access a set of electronic marketplace infrastructure services 204 utilizing an electronic marketplace network site development toolkit ("web development toolkit") 206. The infrastructure services 204 may include a catalog module 208 configured at least to maintain categorized sets of items offered for sale in the electronic marketplace 200. A customer accounts module 210 may be configured at least to maintain customer accounts for the electronic marketplace 200. For example, a customer account may maintain customer preferences, record customer activity including order history and maintain an account balance for a customer of the electronic marketplace 200. An inventory module 212 may be configured at least to track inventory with respect to items in catalogs. For example, the inventory module 212 may track numbers of physical items in warehouses available for shipping to customers. A shipping module may be configured to provide for scheduling and tracking of shipments of ordered items to customers. A payment module 216 may be configured at least to facilitate payments by customers utilizing a variety of payment instruments. A personalization module 218 may be configured at least to personalize a shopping experience for a customer. For example, the personalization module 218 may display items most likely to be of interest to the customer based on order history, as well as related items, related promotions, and the like.

Access to the infrastructure services 204 may be made available in a controlled manner with the web development toolkit 206. The web development toolkit 206 may include a set of components 220, 222, 224, 226, 228, 230 that mediate access to different sets of infrastructure services 204. For example, the components 220, 222, 224, 226, 228, 230 may mediate access to the catalog module 208, the customer accounts module 201, the inventory module 212, the shipping module 214, the payment module 216, and the personalization module 218, respectively. As is conventional, the ellipsis between component 228 and component 230 indicates that the web development toolkit 206 may include any suitable number of such components 220, 222, 224, 226, 228, 230. The ellipsis is employed similarly throughout the Figures. The components 220, 222, 224, 226, 228, 230 need not correspond one-to-one with the modules 208, 210, 212, 214, 216, 218 of the infrastructure services 204.

The toolkit components 220, 222, 224, 226, 228, 230 may have a graphical user interface aspect. For example, individual components 220, 222, 224, 226, 228, 230 may be configured to implement a portion of a network document such as network documents 232, 234. FIG. 2 depicts portions 236, 238, 240, 242 of network document 232 as being implemented by instances of toolkit components 226, 220, 222, 228, respectively, and portions 244, 246, 248, 250 of network document 234 as being implemented by instance of toolkit components 224, 230, 220, 226, respectively. As depicted, network documents 232, 234 can incorporate any suitable number of component instances, and the instances need not always control the appearance of the same portion of a network document. In addition, different instances of a same toolkit component can have a different appearance depending on configuration.

Figure 3:
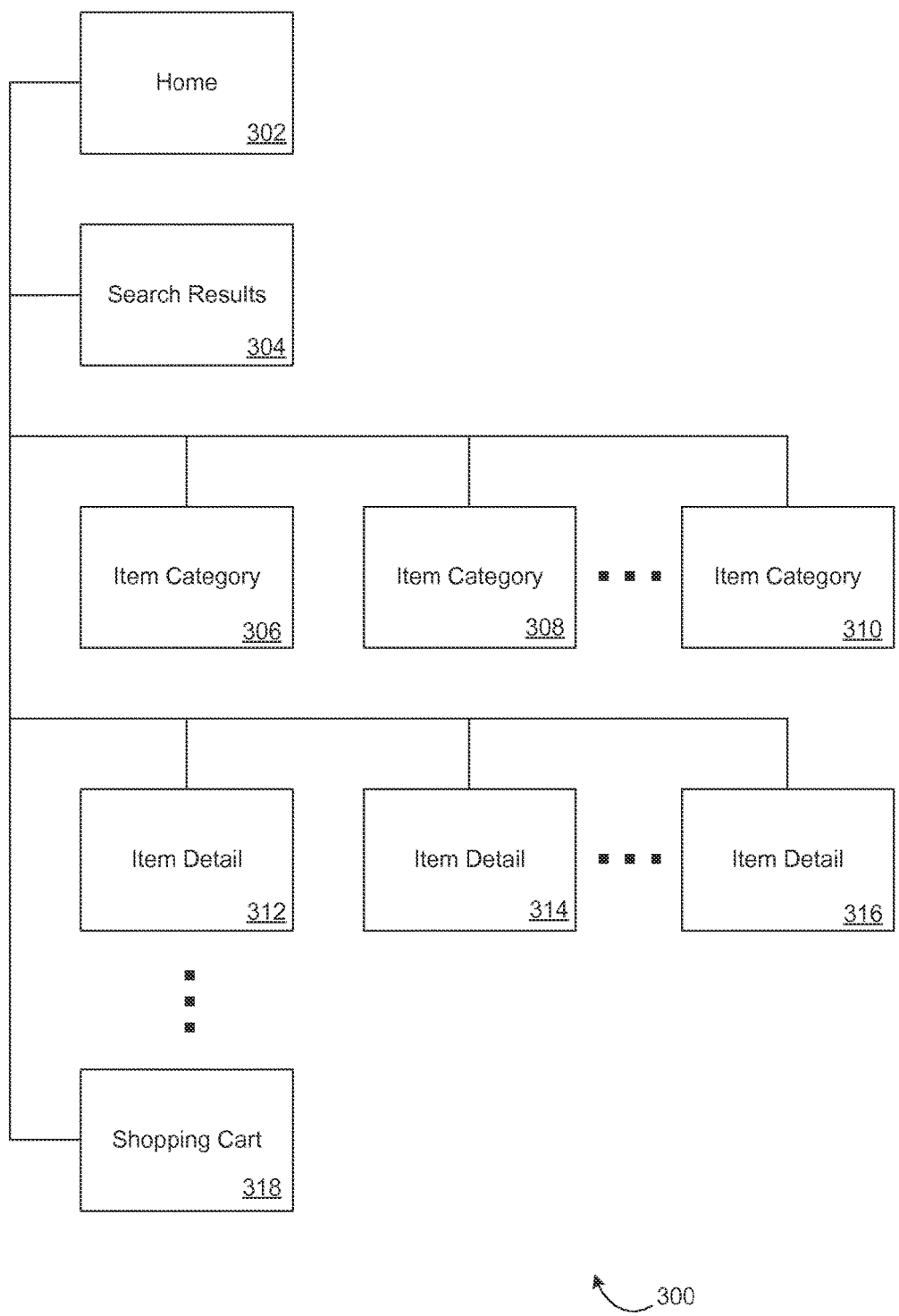
FIG. 3 is a schematic diagram depicting aspects of an example electronic marketplace network site in accordance with at least one embodiment.

The network documents 232, 234 of a particular electronic marketplace network site may correspond to one of a number of types of network document and/or particular sets of electronic marketplace functionality. FIG. 3 depicts aspects of an example electronic marketplace network site 300 in accordance with at least one embodiment. The network site 300 is shown having at least five types of network document including a home document 302, a search results document 304, item category documents 306, 308, 310, item detail documents 312, 314, 316 and a shopping cart document 318. As depicted, each type of network document may include one or more document instances. The lines connecting the network documents 302, 304, 306, 308, 310, 312, 314, 316, 318 indicate that, in this example, each network document of the network site 300 is navigable from any other network document, for example, utilizing a network document browser such as a "web" browser.

For example, the home document 302 may be located at a root node of the network site 300, and may be expected to be the first document of the network site 300 that is encountered by a customer. For example, the home document 302 may have the URL "http://acmeclothing.com/". The home document 302 may incorporate a keyword search component of the web development toolkit 206 (FIG. 2), and the customer might enter the keywords "something warm" triggering a navigation to the search results document 304 having relevant results including links to particular item category documents 306, 308, 310 "Coats", "Hats", "Scarves" and particular item detail documents 312, 314, 316 "White Sweater", "Woolen Mittens", "6 foot Tartan Scarf". For example, the search results document 304 might have URL "http://acmeclothing.com/search", the item category documents 306, 308, 310 might have URLs "http://acmeclothing.com/department/coats", "http://acmeclothing.com/department/hats", "http://acmeclothing.com/department/scarves", and the item detail documents 312, 314, 316 may have URLs "http://acmeclothing.com/item?id=456", "http://acmeclothing.com/item?id=321", "http://acmeclothing.com/item?id=678". The item detail documents 312, 314, 316 may incorporate an "add to cart" and/or "checkout" element that causes navigation to the shopping cart document 318. For example, the shopping cart document 318 might have URL "http://acmeclothing.com/cart".

Figure 4:
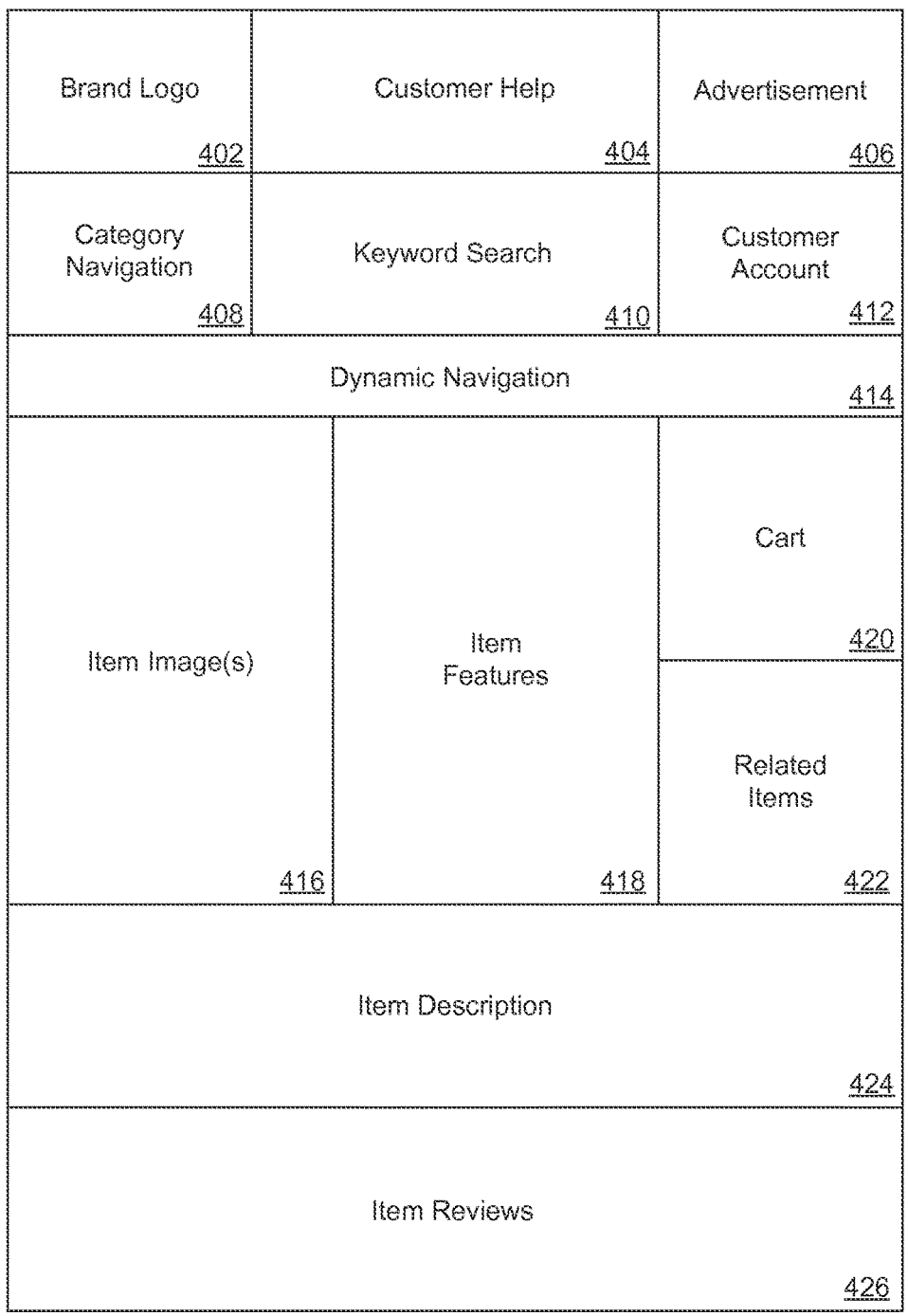
FIG. 4 is a schematic diagram depicting aspects of an example electronic marketplace network document in accordance with at least one embodiment.

FIG. 4 depicts aspects of an example electronic marketplace network document 400 in accordance with at least one embodiment. The network document 400 is an item detail type network document including multiple rectangular regions. Individual regions of the network document 400 are dedicated to different purposes. The regions include a brand logo region 402, a customer help region 404, an advertisement region 406, a category navigation region 408, a keyword search region 410, a customer account region 412, a dynamic navigation region 414, an item image(s) region 416, an item features region 418, a shopping cart region 420, a related items region 422, an item description region 424, and an item reviews region 426. For example, the brand logo region 402 may include one or more graphic design elements corresponding to a brand logo of the merchant. The brand logo region 402 may be relatively static across a set of item detail documents. The customer help region 404 may provide simple links to customer assistance information or may implement more sophisticated user interface elements such as interactive chat. The advertisement region 406 may display an advertisement for an item or promotion likely to be of interest to a particular customer browsing the item detail document 400. The item associated with the item detail document 400 may be in a particular item category. The category navigation region 408 may indicate the current item category and/or provide access to other item categories.

Several of the regions, such as the category navigation region 408, the keyword search region 410, the customer account region 412, the dynamic navigation region 414, the shopping cart region 420 and the related items region 422, may be semantically stable across the set of item detail documents of a network site (e.g., the network site 300 of FIG. 3). For example, such regions may maintain a relatively constant appearance and/or behavior. Several of the regions, such as the item image(s) region 416, the item features region 418, the item description region 424 and the item reviews region 426 may have dynamically varying content depending on the particular item displayed and, in effect, may be framed by the semantically stable regions or framework regions.

Figure 5:
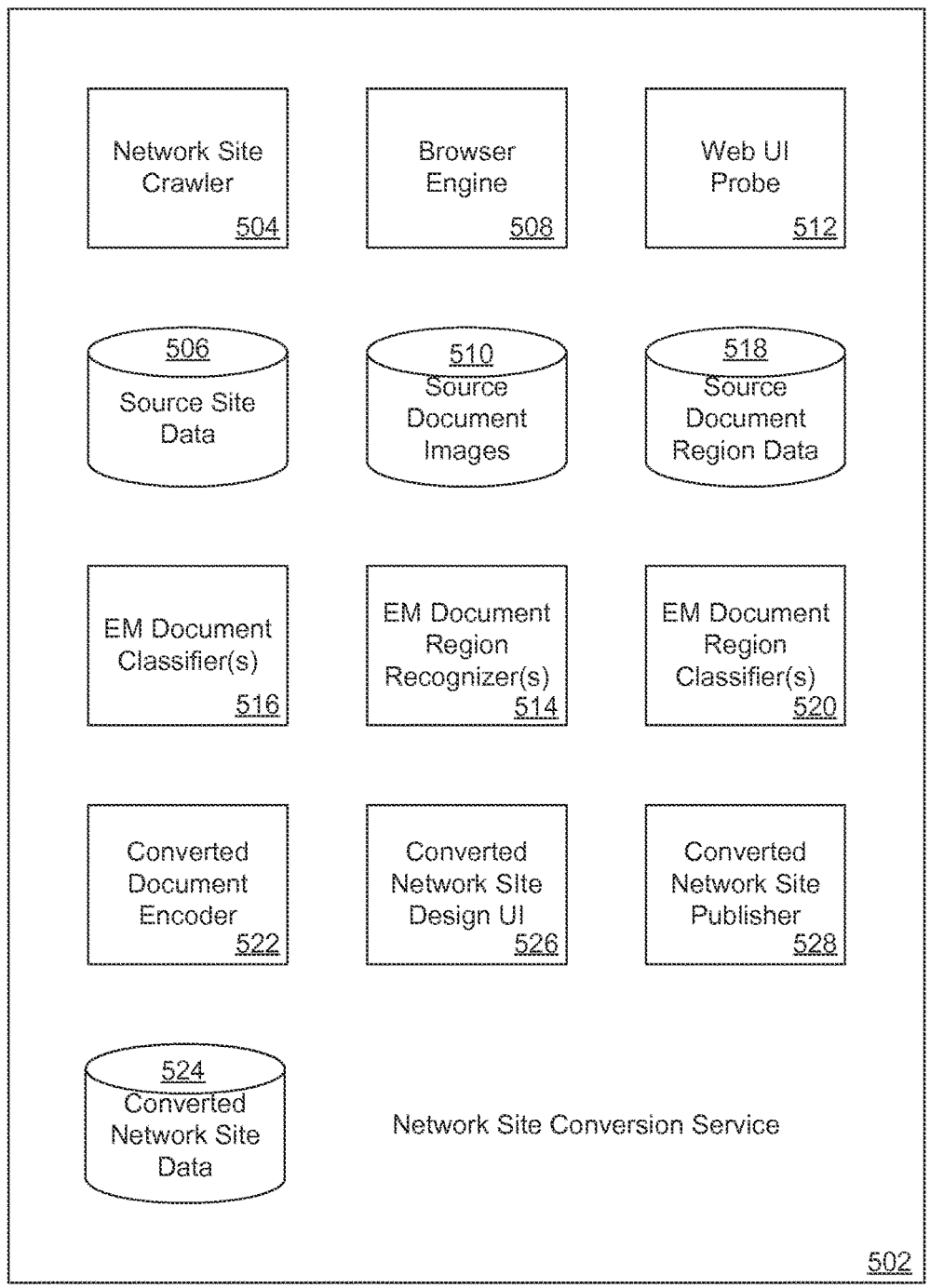
FIG. 5 is a schematic diagram depicting aspects of an example network site conversion service in accordance with at least one embodiment.

FIG. 5 depicts aspects of an example network site conversion service 502 in accordance with at least one embodiment. The network site conversion service 502 may include a network site crawler 504 configured at least to traverse source network sites and receive associated network site data. Such network site data may be stored in a source site data store 506. A browser engine 508 may be configured at least to render collected network site data (e.g., hypertext markup language, cascading style sheets, programming language instructions such as scripting language instructions) into network document images that may be stored in a source document image data store 510. At times, network document regions may be interactive and, for example, may change an appearance of the network document responsive to one or more user interface (UI) events. A web UI probe 512 may be configured at least to trigger such UI events, and the browser engine 508 may render the changed appearance of the network document. In this way, the source document image data store 510 may include a series of rendered images for a single network document each with a different appearance (sometimes called a "movie" of the network document). Such differences can help define regions of the network document and can help identify a type of a region. The browser engine 508 is an example of a network document product engine. The network site conversion service 502 may include any suitable network document product engine and any suitable number of network document product engines. Such engines may process network documents and/or source site data 506 to generate any suitable network document product including rendered network document images and network document movies, and pre-rendering structures such as parsed content trees (e.g., of domain object model or DOM nodes) and component layouts (e.g., such that graphical components are each assigned a suitable height and width).

A set of electronic marketplace (EM) network document region recognizers 514 (e.g., machine learning components)

may be configured at least to recognize framework regions of network documents based at least in part on the rendered source document images 510 including source document movies and/or any suitable network document product. There may be a corresponding network document region recognizer for individual types of network document, and a set of EM document classifiers 516 (e.g., machine learning components) may be configured at least to determine a type of a given network document based at least in part on collected source site data 506, rendered source document images 510 and/or any suitable network document product. Data defining and/or corresponding to identified network document regions may be stored in a source document region data store 518. A set of EM document region classifiers 520 (e.g., machine learning components) may be configured at least to determine a type or classification of individual identified network document regions based at least in part on collected source site data 506, rendered source document images 510, any suitable network document product and/or one or more outputs of the EM document region recognizers 514. The source document region data 518 may be updated with the determined region classifications.

A converted document encoder 522 may be configured at least to generate converted network documents based at least in part on corresponding source document data in the source site data store 506, the source document image store 510 and/or the source document region data 518. For example, the encoder 522 may copy graphic design elements from the source site data store 506, may map classified framework regions identified in the source document region data store 518 to components of a web development toolkit such as the web development toolkit 206 of FIG. 2, and may configure instances of such components to implement corresponding electronic marketplace functionality. Converted network documents and associated data may be stored in a converted network site data store 524. A converted network site design UI 526 (e.g., a graphical user interface) may enable an authorized user (e.g., a web designer) to edit a fully or partially converted network site. A converted network site publisher 528 may be utilized to publish the converted network site.

Figure 6:
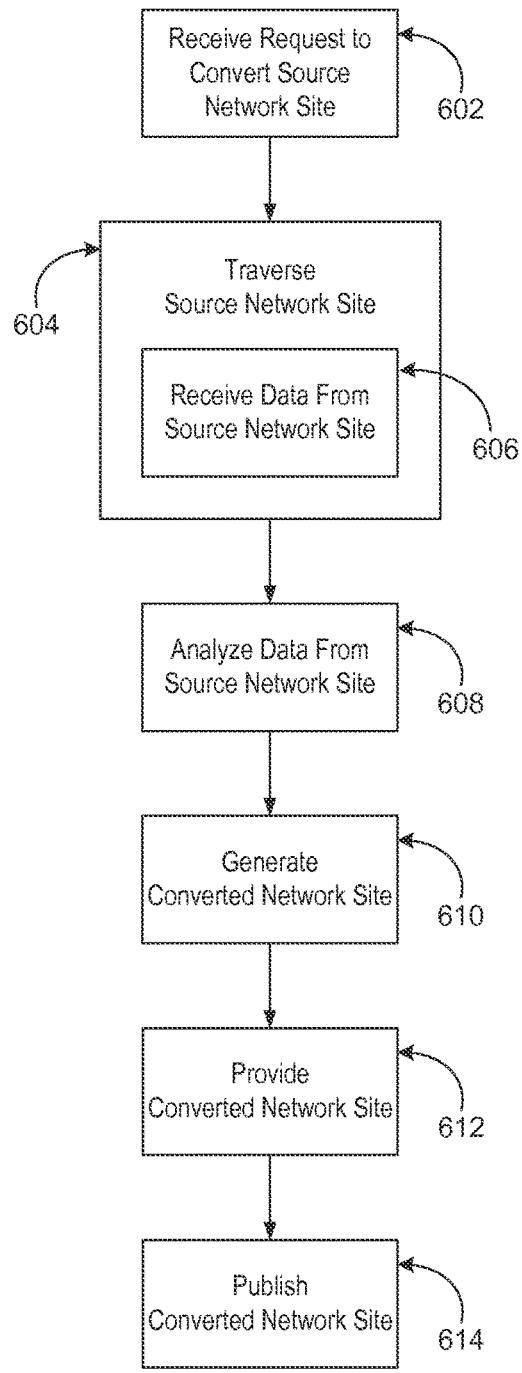
FIG. 6 is a flowchart depicting aspects of an example process for converting a source network site in accordance with at least one embodiment.

FIG. 6 depicts aspects of an example process for converting a source network site in accordance with at least one embodiment. At 602, a request to convert a source network site may be received. For example, the network site conversion service 108 (FIG. 1) may receive the request from the computing device 104. At 604, the source network site may be traversed, for example, by the network site crawler 504 (FIG. 5). At 606, data may be received from the source network site, for example, by the network site crawler 504. At 608, the network site data may be analyzed, for example, utilizing the browser engine 508, web UI probe 512, EM document classifier(s) 516, EM document region recognizer(s) 514 and/or the EM document region classifier(s) 520. At 610, a converted network site may be generated, for example, utilizing the converted document encoder 522. At 612, the converted network site may be provided for presentation. For example, the converted network site publisher 528 may provide the converted network site to the electronic marketplace 200 (FIG. 2) for hosting as one of the toolkit integrated network sites 202. At 614, the converted network site may be published. For example, the electronic marketplace 200 may make the converted network site available to the general public as the converted network site 110 (FIG. 1).

Figure 7:
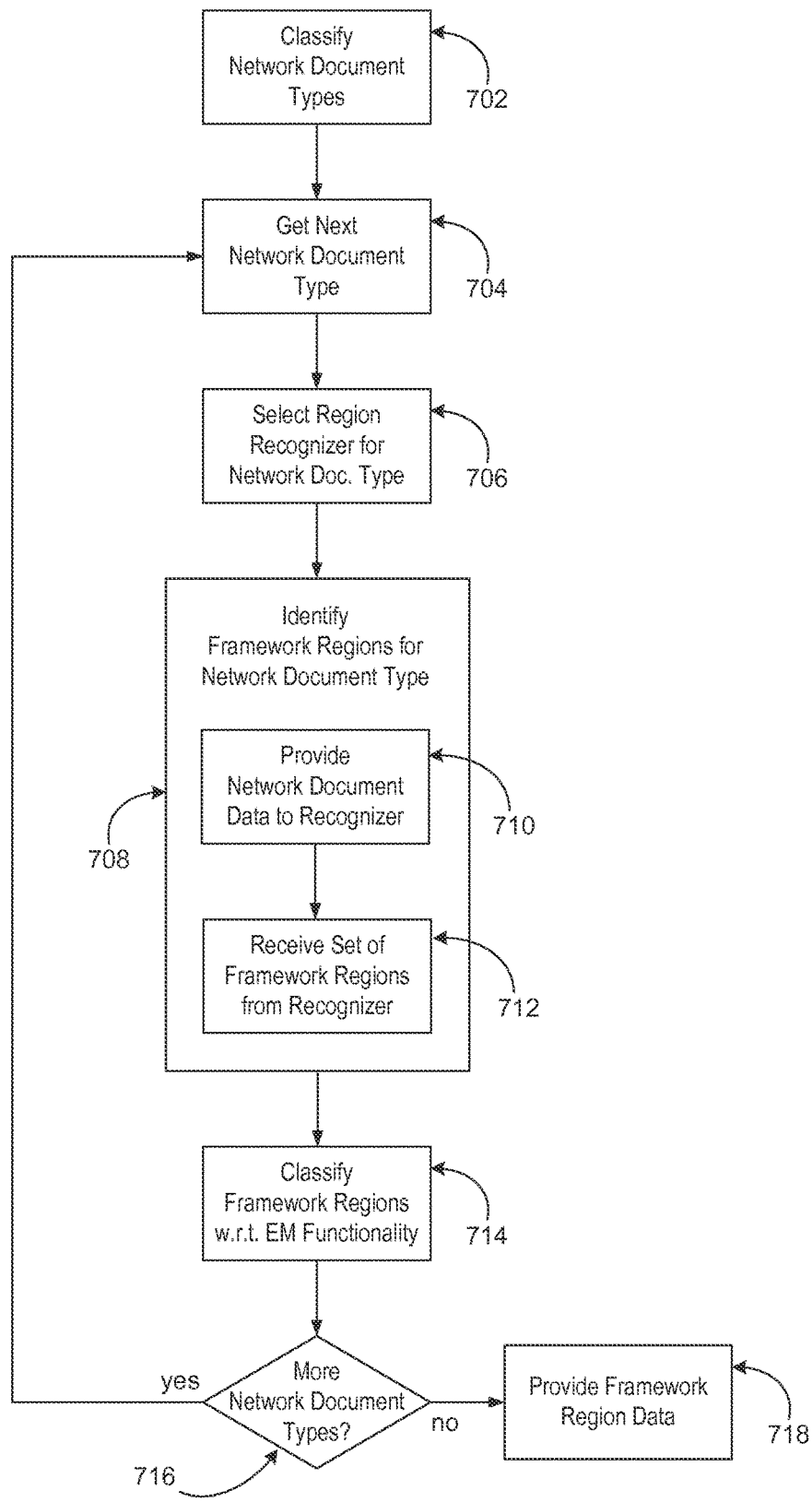
FIG. 7 is a flowchart depicting aspects of an example process for determining framework region data in accordance with at least one embodiment.

FIG. 7 depicts aspects of an example process for determining framework region data in accordance with at least one embodiment. At 702, network document types may be classified, for example, with the EM document classifier(s) 516 (FIG. 5). For example, it may be determined that the source network site 102 (FIG. 1) includes multiple types of EM network document (as depicted in FIG. 3). At 704, a next (e.g., a first) network document type may be selected, for example, by the network site conversion service 502. At 706, a region recognizer may be selected for the current network document type, for example, an EM document region recognizer 514 corresponding to the current network document type. At 708, framework regions may be identified for the network document type, for example, utilizing the region recognizer selected at 706. Such identification may include providing network document data to the recognizer (at 710) and receiving a set of identified framework regions from the recognizer (at 712). At 714, the identified framework regions may be classified with respect to EM functionality, for example, with the EM document region classifiers 520. If there are more network document types to process (as tested at 716), the process may progress to 704. Otherwise, the process may progress to 714, at which the determined framework region data may be provided for storage and/or presentation. Such data may include the results of 702, 708 and/or 714.

Figure 8:
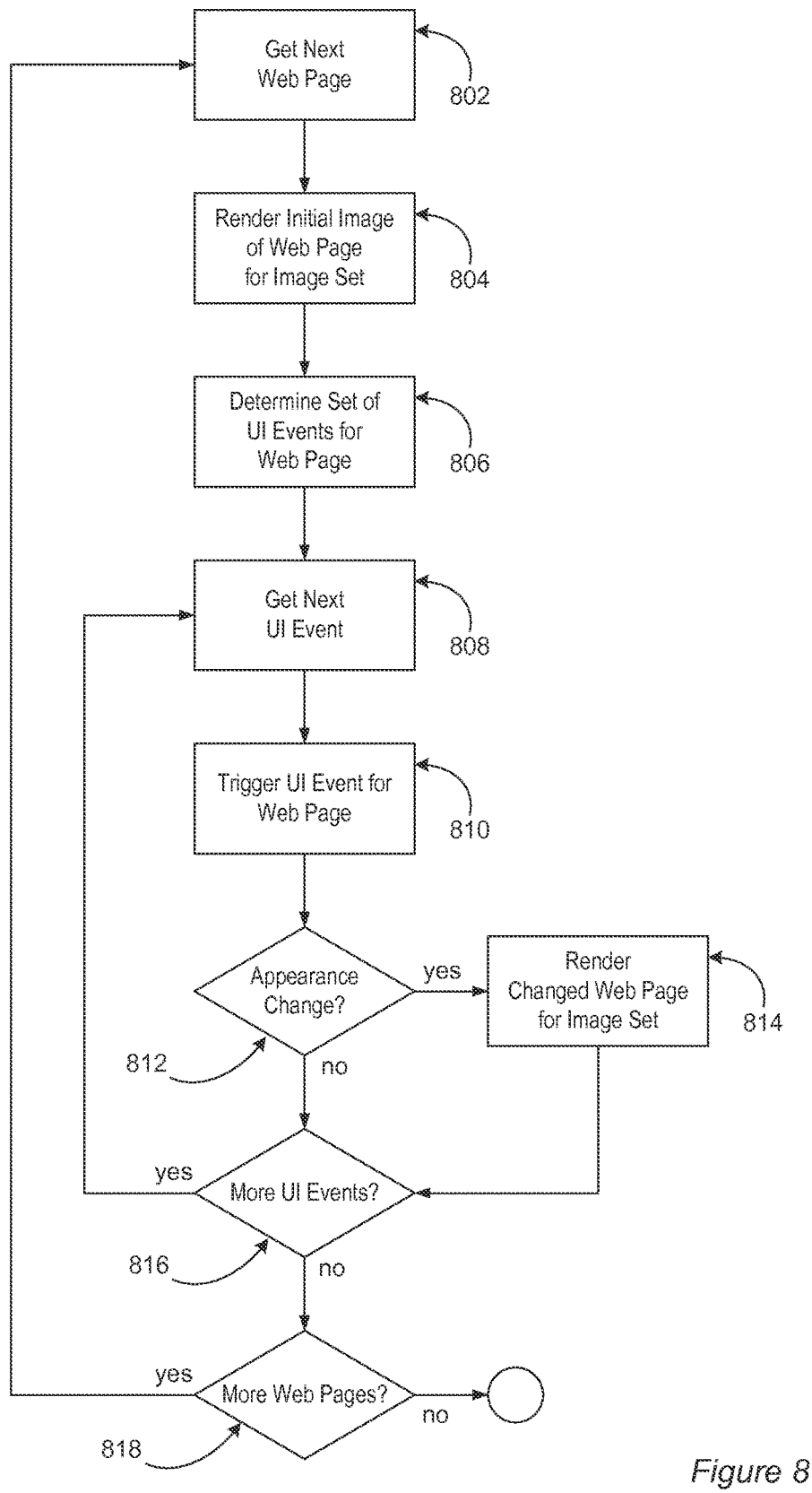
FIG. 8 is a flowchart depicting aspects of an example process for generating network document data for analysis in accordance with at least one embodiment.

FIG. 8 depicts aspects of an example process for generating network document data for analysis in accordance with at least one embodiment. A source network site such as the source network site 102 (FIG. 1) may include multiple network documents. At 802, a next (e.g., a first) network document may be selected, for example, by the network site conversion service 502 (FIG. 5). At 804, an initial image of the selected network document may be rendered, for example, with the browser engine 508. At 806, a set of UI events for the network document may be determined, for example, by the web UI probe 512. At 808, a next (e.g., a first) of the set of UI events may be selected, for example, by the web UI probe 512. At 810, the selected event may be triggered, for example, by the web UI probe 512. If it is detected that the triggered event changes an appearance of the network document (as tested at 812), a changed network document image may be rendered (at 814). If there are more UI events to process, the process may progress to 808. Otherwise the process may progress to 818 to test whether there are more network documents to be processed. If so, the process may progress to 802. Otherwise, the process may progress to operations not depicted in FIG. 8, for example, to 702 of FIG. 7.

Figure 9:
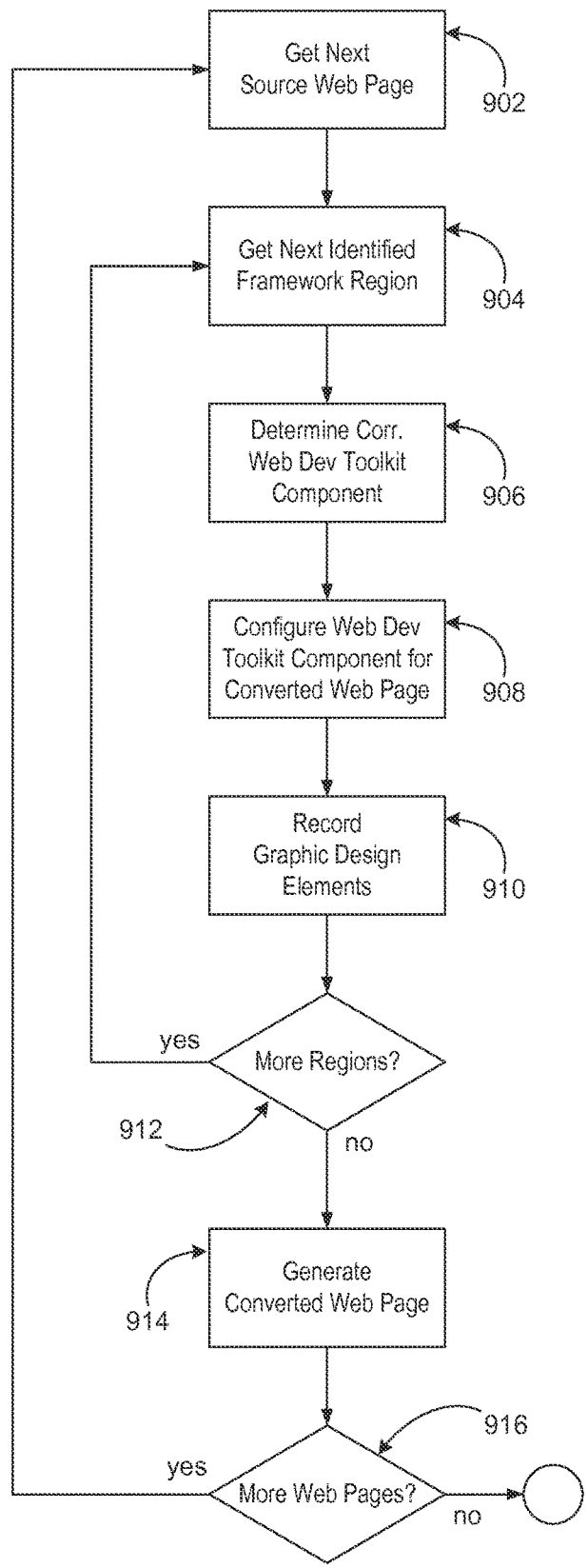
FIG. 9 is a flowchart depicting aspects of an example process for generating a converted network site in accordance with at least one embodiment.

FIG. 9 depicts aspects of an example process for generating a converted network site in accordance with at least one embodiment. The converted network site 110 (FIG. 1) may include multiple converted network documents corresponding to multiple network documents of the source network site 102. At 902, a next (e.g., a first) source network document may be selected, for example, by the network site conversion service 502 (FIG. 5). Individual source network documents may have multiple identified framework regions, for example, as specified by the source document region data 518. At 904, a next (e.g., a first) identified framework region may be selected, for example, by the converted document encoder 522. At 906, a correlated web development toolkit component may be determined. For example, the converted document encoder 522 may map a classification of the selected framework region to a suitable component 222 of the web development toolkit 206 (FIG. 6) such as in accordance with a pre-determined type-component map. At 908, an instance of the correlated component 222 may be configured to implement the identified framework region in the converted network document, for example, by the converted document encoder 522. At 910, corresponding graphic design elements may be recorded, for example, in the converted network site data store 524. If there are more identified framework regions to be processed for the current source network document (as tested at 912), the process may progress to 904. Otherwise, the process may progress to 914 to generate the converted network document. For example, the converted document encoder 522 may encode the converted network document based at least in part on the toolkit components configured at 908 and the graphic design elements recorded at 910. If there are more source network documents to process (as tested at 916), the process may progress to 902. Otherwise the process may progress to an operation not depicted in FIG. 9, such as 612 of FIG. 6.

Figure 10:
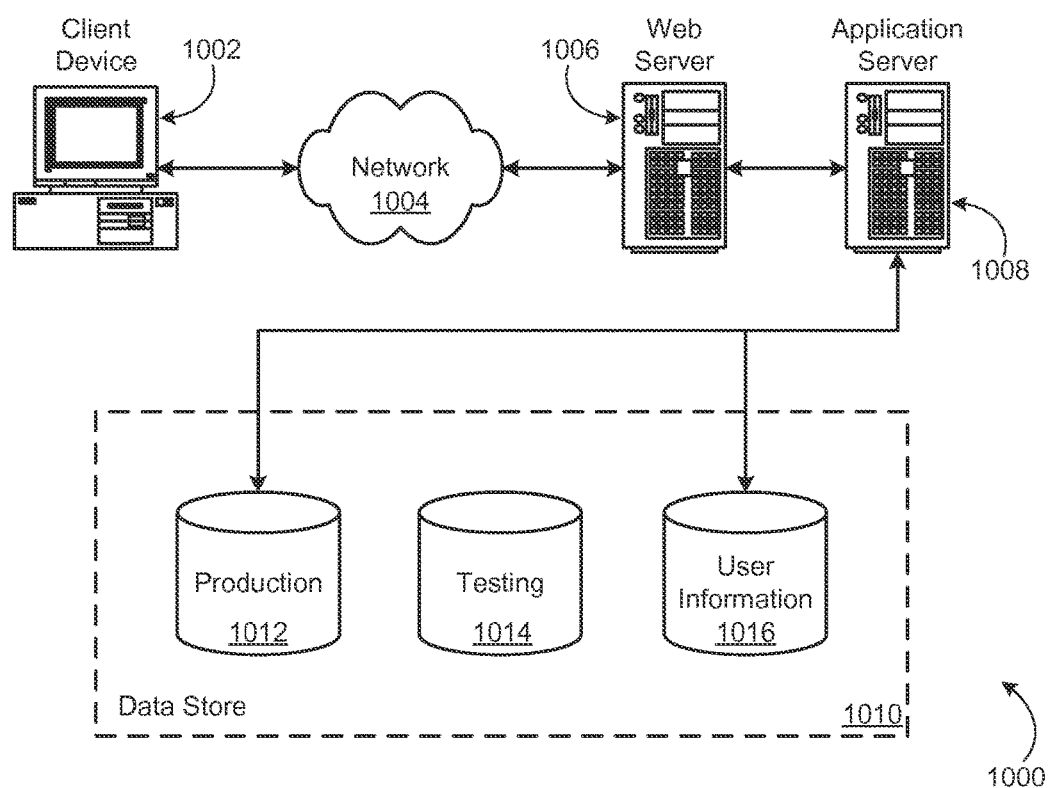
FIG. 10 is a schematic diagram depicting aspects of an example computing environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, smart phones, handheld messaging devices, laptop computers, set-top boxes, personal data assistants, electronic book readers, tablet computers, wearable computing devices and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the web server. It should be understood that the web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for document image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a network document that the user is able to view via a browser on the user device 1002. Information for a particular item of interest can be viewed in a dedicated document or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    traversing, with one or more computers, a source network site of a first electronic marketplace to obtain a set of network documents of the source network site;
    rendering, by a browser engine of the one or more computers, network document images based at least in part on data collected for the set of network documents;
    identifying, with the one or more computers, a framework region of the set of network documents based at least in part on the network document images, the framework region at least maintaining a common appearance and behavior across the set of network documents;
    determining, with the one or more computers, a component of a web development toolkit, the component corresponding to the framework region based at least in part on a classification of the framework region with respect to a set of functionalities of the source network site of the first electronic marketplace, the web development toolkit corresponding to a network site of a second electronic marketplace, the component mediating access to the set of functionalities for the framework region by at least supporting the set of functionalities at a user interface element within the framework region in a converted network site;
    generating, with the one or more computers, a set of converted network documents corresponding to the set of network documents of the source network site, the set of the converted network documents using at least the component of the web development toolkit; and
    providing, with the one or more computers, the converted network site for presentation to a user of the second electronic marketplace, the converted network site including the set of converted network documents.

2. The computer-implemented method of claim 1, further comprises analyzing the set of network documents by at least identifying, for individual network documents, a type of the network document among a set of pre-determined electronic marketplace network document types.

3. The computer-implemented method of claim 2, wherein the type of the network document is identified at least in part with a machine learning component, wherein the machine learning component distinguishes between electronic marketplace network document types based at least in part on the network document data and associated uniform resource locators.

4. The computer-implemented method of claim 1, further comprises analyzing the set of network documents by at least identifying, for individual network documents, a set of framework regions of the network document with respect to similar network documents.

5. The computer-implemented method of claim 4, wherein individual framework regions correspond to individual components of the web development toolkit of the second electronic marketplace.

6. The computer-implemented method of claim 4, wherein individual framework regions of the network document are identified at least in part with a machine learning component that distinguishes between framework and non-framework regions of the similar network documents based at least in part on one or more rendered images of the similar network documents.

7. A computer-implemented method, comprising:
    receiving, within one or more computers, data from a source network site that comprises a source network document;
    rendering, by a browser engine of the one or more computers, network document images based at least in part on the data;
    identifying, with the one or more computers, a framework region of the source network document based at least in part on the network document images, the framework region at least maintaining a common appearance and behavior across a plurality of source network documents of the source network site;
    identifying, with the one or more computers, at least one correspondence of the framework region with a set of components of a web development toolkit associated with a network site development platform having a set of functionalities, the set of components mediating access to the set of functionalities for the framework region by at least supporting the set of functionalities at a user interface element within the framework region in a converted network site;
    generating, with the one or more computers, the converted network site based at least in part on the identification of the at least one correspondence, the converted network site utilizing the at least one correspondence with the set of components of the web development toolkit; and
    providing, with the one or more computers, the converted network site for presentation.

8. The computer-implemented method of claim 7, wherein the data from the source network site includes elements of a hypertext markup language and further comprising rendering one or more images of one or more network documents based at least in part on the elements of the hypertext markup language.

9. The computer-implemented method of claim 7, wherein the data from the source network site includes elements of a computer programming language and further comprising rendering one or more images of one or more network documents based at least in part on the elements of the computer programming language.

10. The computer-implemented method of claim 9, wherein the elements of the computer programming language of individual network documents change an appearance of the network document responsive to one or more user interface events and further comprising rendering an image of the network document corresponding to individual changed appearances of the network document at least in part by triggering the one or more user interface events.

11. The computer-implemented method of claim 7, further comprising identifying, for individual source network documents of the source network site, one or more framework regions with respect to similar source network documents of the source network site.

12. The computer-implemented method of claim 11, wherein the at least one correspondence with the set of components of the web development toolkit includes correspondences between the one or more framework regions and one or more of the set of components of the web development toolkit.

13. The computer-implemented method of claim 7, wherein generating the converted network site includes, generating a converted network document in which the identified framework region of the source network document is implemented with the set of components of the web development toolkit.

14. A computerized system, comprising:
a first machine learning component configured at least to classify a region of a network document with respect to a pre-defined set of electronic marketplace functionalities;
a network site conversion service configured to, at least:
receive a network document of a source network site of an electronic marketplace;
render a network document image based at least in part on the network document;
identify a framework region of the network document of the source network site with respect to similar network documents of the source network site, the framework region identified based at least in part on network document image and the similar network documents, the framework region at least maintaining a common appearance and behavior across the network document and the similar network documents;
determine a classification of the framework region with the first machine learning component; and
generate a converted network document based at least in part on a correspondence of the framework region with a set of components of a web development kit, the set of components mediating access to the pre-defined set of electronic marketplace functionalities for the framework region by at least supporting the pre-defined set of electronic marketplace functionalities at a user interface element within the framework region in the converted network document; and
one or more processors configured to facilitate at least the first machine learning component and the network site conversion service.

15. The computerized system of claim 14, wherein the network site conversion service is further configured to map the framework region to a component of the web development toolkit based at least in part on the determined classification of the framework region with respect to the pre-defined set of electronic marketplace functionalities.

16. The computerized system of claim 15, wherein:
the web development toolkit includes a plurality of sets of components, individual sets of components corresponding to an electronic marketplace functionality of the pre-defined set of functionalities; and
mapping the framework region to the component of the web development toolkit includes mapping the determined classification of the framework region to a corresponding set of components of the web development toolkit.

17. The computerized system of claim 14, wherein the framework region of the network document is identified at least in part with a second machine learning component that distinguishes between framework and non-framework regions of network documents of network sites of electronic marketplaces based at least in part on one or more rendered images of the network documents.

18. The computerized system of claim 14, wherein the network site conversion service is further configured to provide the identification and classification of the framework region for presentation.

19. One or more non-transitory computer-readable media collectively storing computer-executable instructions that, when executed by one or more computers, cause the one or more computers to collectively, at least:
receive data specifying a network document of a source network site of an electronic marketplace;
render a network document image based at least in part the data;
provide information associated with at least a portion of the network document image to a first machine learning component configured at least to identify a framework region of the network document with respect to similar network documents of network sites of electronic marketplaces, the framework region at least maintaining a common appearance and behavior across a plurality of network documents of the source network site;
receive an identification of the framework region of the network document; and
generate a converted network document based at least in part on the identification of the framework region and a correspondence of the framework region with a set of components of a web development kit associated with a network site development platform having a set of functionalities, the set of components mediating access to the set of functionalities for the framework region by at least supporting the set of functionalities at a user interface element within the framework region in the converted network document.

20. The one or more computer-readable media of claim 19, wherein the network document comprises a plurality of regions corresponding to a plurality of rectangles specified at least in part with a hypertext markup language, the plurality of regions including at least one framework region corresponding to at least one semantically stable element of a graphical user interface and at least one non-framework region corresponding to at least one semantically dynamic element of the graphical user interface.

21. The one or more computer-readable media of claim 19, wherein:
the framework region corresponds to an element of a graphical user interface that implements an aspect of electronic marketplace functionality that is common to a plurality of electronic marketplaces; and
the framework region is determined to correspond to a component of the web development toolkit that implements the aspect of electronic marketplace functionality.

22. The one or more computer-readable media of claim 19, wherein:
- the network site of electronic marketplaces have a plurality of types of network document; and
- the computer-executable instructions further cause the one or more computers to use a plurality of machine learning components to identify framework regions, individual machine learning components identifying framework regions of a type of network document among the plurality of types of network documents.

23. The one or more computer-readable media of claim 22, wherein the computer-executable instructions further cause the one or more computers to collectively, at least:
- identify the type of the network document among the plurality of types of network document with a second machine learning component; and
- select the first machine learning component from among the plurality of machine learning components based at least in part on the identified type of the network document.

* * * * *

UNITED STATES PATENT AND TRADEMARK OFFICE
CERTIFICATE OF CORRECTION

PATENT NO.         : 9,870,347 B1
APPLICATION NO.    : 14/106445
DATED              : January 16, 2018
INVENTOR(S)        : Shashank Shekhar et al.

It is certified that error appears in the above-identified patent and that said Letters Patent is hereby corrected as shown below:

In the Claims

In Column 16, Line 2, Claim 16:
Delete: "the pre-defined set of functionalities; and"
Insert: --the pre-defined set of electronic marketplace functionalities; and--

Signed and Sealed this
Eighth Day of October, 2019

Andrei Iancu
*Director of the United States Patent and Trademark Office*